United States Patent Office 3,767,593
Patented Oct. 23, 1973

3,767,593
CATALYST SYSTEM FOR DIMERIZING CONJUGATED DIENES COMPRISING A DINITROSYLIRON HALIDE AND A REDUCING AGENT
Charles L. Myers, Bartlesville, Okla., assignor to Phillips Petroleum Company
No Drawing. Application Dec. 10, 1970, Ser. No. 97,016, now Patent No. 3,655,793, which is a continuation-in-part of abandoned application Ser. No. 889,748, Dec. 31, 1969. Divided and this application Jan. 3, 1972, Ser. No. 215,140
Int. Cl. B01j 11/82
U.S. Cl. 252—429 A     12 Claims

ABSTRACT OF THE DISCLOSURE

A dimerization catalyst system formed from (I) a dinitrosyliron halide and (II) a reducing agent, in which the reducing agent is an alkali metal hydride, a complex hydride of an alkali metal and boron or aluminum, or an organoaluminum halide.

---

This application is a divisional application of United States application S.N. 97,016, filed Dec. 10, 1970, which issued on Apr. 11, 1972 as U.S. Pat. No. 3,655,793, and which is a continuation-in-part of United States application S.N. 889,748, filed Dec. 31, 1969, now abandoned.

This invention relates to the dimerization of conjugated dienes. In another aspect, it relates to catalysts useful in the dimerization of conjugated dienes.

Various processes have been developed for the dimerization of conjugated dienes. However, some of these processes yield, besides the desired dimers, a wide variety of other products which substantially reduce the ultimate yield of the desired dimer. Since the conjugated diene dimers are useful as intermediates for the production of a large number of compounds, a process leading to the production of these dimers in large yields would be very valuable.

Accordingly, it is an object of this invention to provide a process for the dimerization of conjugated dienes. It is a further object of my invention to provide a novel catalyst system.

Other objects, aspects and advantages of this invention will be readily apparent to one skilled in the art upon consideration of the following disclosure and appended claims.

It now has been discovered that conjugated dienes can be dimerized by contacting the diene with a catalyst consisting essentially of that formed from (I) a dinitrosyliron halide and (II) a reducing agent which is an organoaluminum halide, an alkali metal hydride, or a complex hydride of an alkali metal plus boron or aluminum. It also has been discovered that the diene can be present before the dinitrosyliron halide comes in contact with the organoaluminum halide, the alkali metal hydride, or the complex hydride. Thus, my catalyst can be prepared in the reactor used for the dimerization of the diene, and the presence of additional ligand-forming compounds is not required.

The conjugated dienes that are employed in my invention are represented by the formula:

$$CH_2=\overset{R}{\underset{|}{C}}-\overset{R}{\underset{|}{C}}=CH_2$$

wherein R is hydrogen, methyl or ethyl. Thus, conjugated dienes that are employed in this invention can range from 4 to 8 in the number of carbon atoms per molecule.

Specific examples of these dienes are: 1,3-butadiene, isoprene, 2,3-dimethyl-1,3-butadiene, 2-ethyl-1,3-butadiene, 2-methyl-3-ethyl-1,3-butadiene, 2,3-diethyl-1,3-butadiene, and mixtures thereof.

In accordance with my invention, conjugated dienes are dimerized to produce substituted cyclohexenes represented by the formula:

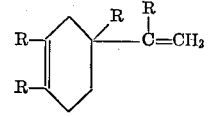

wherein R is as previously defined.

Specific examples of these substituted cyclohexenes include 4-vinylcyclohexene, 1,4-dimethyl-4-vinylcyclohexene, 2,4-dimethyl-4-vinylcyclohexene, 1,2,4-trimethyl-4-isopropenylcyclohexene, 1,4-diethyl-4-vinylcyclohexene, 1-methyl-2,4-diethyl-4-isopropenylcyclohexene, 1,2,4-triethyl-4-(1-ethylvinyl)-cyclohexene, 2-methyl-4-vinylcyclohexene, and the like, and mixtures thereof.

The dinitrosyliron halides that are employed in my invention can be represented by the formula $Fe(NO)_2X$ wherein X is a halogen and preferably is chlorine, bromine, or iodine. Specific dinitrosyliron halides are dinitrosyliron chloride, dinitrosyliron bromide, and dinitrosyliron iodide. Some dinitrosyliron halides are believed to exist in dimeric and possibly other polymeric forms. However, for purpose of this invention, particularly in regard to molar calculations, the dinitrosyliron halides are considered to be monomeric having but one atom of iron per molecule.

In accordance with my invention, the organoaluminum halides are represented by the formula $R_x'AlX_y$ wherein R' is a monovalent hydrocarbon radical having 1 to 20 carbon atoms, preferably 1 to 6 carbon atoms, X is as previously defined, $x$ and $y$ are integers of at least 1, and the sum of $x$ and $y$ is 3.

Specific examples of these organoaluminum halides include methylaluminum dichloride, dimethylaluminum chloride, ethylaluminum dibromide, diethylaluminum chloride, vinylaluminum dichloride, isopropylaluminum dibromide, dibutylaluminum iodide, dihexylaluminum chloride, phenylaluminum dibromide, dibenzylaluminum chloride, para-tolylaluminum dichloride, dodecylaluminum dibromide, dieicosylaluminum chloride, and mixtures thereof such as methylaluminum sesquichloride, ethylaluminum sesquichloride, and the like.

Specific examples of alkali metal hydrides include lithium hydride, sodium hydride, potassium hydride, rubidium hydride, and cesium hydride.

Specific examples of applicable complex hydrides of alkali metals and boron or aluminum include lithium aluminum hydride, lithium borohydride, sodium aluminum hydride, sodium borohydride, potassium borohydride, rubidium aluminum hydride, cesium borohydride, and the like.

Of course, it is feasible and suitable to use combinations, where desired, of an alkali metal hydride plus a complex hydride, or of an alkali metal hydride with an organoaluminum halide, or other admixture, in addition to using the nitrosyliron compound as herein before described.

Preferably, a diluent or solvent, substantially nonreactive or very slowly reactive with the other components, can be employed. When an organoaluminum halide is employed as the reducing agent, a saturated or aromatic hydrocarbon such as pentane, heptane, cyclohexane, benzene, toluene, or xylene can be employed. Other suitable diluents or solvents are the halogenated aliphatic hydrocarbons such as tetrachloroethylene, or the halogenated aromatic hydrocarbons such as chlorobenzene. The saturated or aromatic hydrocarbon, or the halogenated aromatic hydrocarbon, preferably should contain from 2 to 8 carbon atoms per molecule. Mixtures, of course, can be employed if desired.

When the reducing agent is an alkali metal hydride or a complex hydride of an alkali metal and boron or aluminum, it is preferable to employ a solvent which will substantially dissolve or disperse the hydride. Such a solvent should be one which either does not react with the hydride or else reacts with the hydride sufficiently slowly that the major amount of the hydride is enabled to function as a reducing agent in my process for the more reactive dinitrosyliron halide. The preferred solvents for the alkali metal hydrides and alkali metal aluminum hydrides are the ethers of 2 to 8 carbon atoms per molecule, such as tetrahydrofuran, dioxane, dimethyl ether, diethyl, ether, dibutyl ether, and the like, and mixtures thereof.

The preferred solvents for the alkali metal borohydrides are the lower alcohols, of from 1 to 8 carbon atoms per molecule, such as methyl alcohol, ethyl alcohol, isopropyl alcohol, butyl alcohol, octyl alcohol, monomethyl ether of ethylene glycol, and the like, including mixtures thereof. Also applicable are ethers, e.g., ethers of 2 to 8 carbon atoms per molecule such as those described above as solvents for the alkali metal hydrides and alkali metal aluminum hydrides.

If desired, particularly when mixtures of reducing agents are utilized, such as an alkali metal hydride plus a complex hydride, a mixture of diluents of sufficiently little reactivity with the reducing agents present can be employed.

In the process of my invention, the mole ratio of (II) reducing agent to (I) dinitrosyliron halide generally ranges from 0.01:1 to 20:1, preferably from 1:1 to 10:1. The mole ratio of diene to dinitrosyliron halide generally ranges from 50:1 to 50,000:1, preferably from 500:1 to 5,000:1.

Although it can vary considerably, the reaction temperature generally ranges from —40° to 120° C., preferably from 10 to 70° C. The reaction time can vary over a wide range depending in part on the reaction temperature, but generally ranges from 2 minutes to 48 hours, preferably from 10 minutes to 24 hours. The reaction pressure generally is within the range of from 0 to 300 p.s.i.g., preferably from 0 to 100 p.s.i.g.

The dimerization of the diene reactant can be carried out in a batch process, in a continuous process, or in a semi-continuous process wherein the diene is intermittently charged as needed to replace that already dimerized. At the end of the dimerization reaction, the dimer can be recovered by any conventional means known to the art such as distillation, extraction, adsorption, and the like.

The process of my invention, unlike the processes of some catalytic dimerization processes, converts the dienes to substituted cyclohexenes, e.g., butadiene to 4-vinylcyclohexene, without the production of substantially any other products. In addition to this feature of very substantial ultimate yields of the dimer, high conversion and high productivity also can be realized by the process of my invention. Furthermore, the reaction is carried out at mild temperature conditions, thereby avoiding thermal polymerization and/or cracking or other deleterious effects on the dimer product.

The advantages of my invention are further illustrated by the following examples. The reactants, proportions and other specific conditions are presented as being typical and should not be construed to limit the invention unduly.

EXAMPLE I

In a Pyrex aerosol tube, 0.02 g. (gram) of dinitrosyliron chloride was charged and the tube was evacuated. Ten ml. (milliliters) of chlorobenzene were added and the tube again was evacuated and cooled. After the addition of 13.91 g. of 1,3-butadiene, the tube again was cooled and 0.44 ml. of 1.25 M diethylaluminum chloride in heptane were added, followed by the addition of 3 ml. of chlorobenzene. The reaction mixture was stirred and maintained at a temperature of 20° C. for 16 hours. The mixture then was cooled and 10 ml. of pentane were injected. The tube was opened and 25 ml. of 1 M hydrochloric acid were added. The organic layer, with 10 ml. of additional pentane, was separated and washed with water.

Gas chromatographic analysis of the washed organic layer showed that 13.3 g. of 4-vinylcyclohexene were produced, representing a 96 percent conversion of butadiene to 4-vinylcyclohexene. No other volatile product was detected.

This run demonstrates that substantially quantitative yields of the dimer can be obtained according to the process of my invention, as well as high conversion and productivity.

EXAMPLE II

In a 110 ml. Pyrex aerosol tube in a dry-box were placed 0.02 g. (0.1 millimole) of dinitrosyliron chloride and 0.02 g. (0.5 millimole) of lithium aluminum hydride. The tube was evacuated and cooled in ice, and 9.26 g. (171 millimoles) of 1,3-butadiene were added. The tube was cooled in ice-salt, and 10 ml. of tetrahydrofuran were added, after which the mixture was stirred at 40° C. for 19 hours. The tube then was cooled and vented, and 25 ml. of 1 M hydrochloric acid and 15 ml. of pentane were added, and the organic layer recovered as before.

Gas chromatographic analysis of the organic layer showed that 37 millimoles of 4-vinylcyclohexene were produced, representing a 43 percent conversion of butadiene to 4-vinylcyclohexene. No other voltatile product was detected, and only 0.06 g. of non-volatile residue remained upon evaporation of solvent from the organic layer.

This run further demonstrates the effectiveness of the invention using a dinitrosyliron halide together with a complex hydride to produce a dimer with little or no other product formation.

EXAMPLE III

In a 110 ml. Pyrex aerosol tube in a dry-box were placed 0.02 g. (0.1 millimole) of dinitrosyliron chloride and 0.02 g. (0.5 millimole) of sodium borohydride. The tube was evacuated and cooled in ice, and 12.90 g. (239 millimoles) of 1,3-butadiene were added. The tube was cooled in ice-salt at —15° C., and 10 ml. of nitrogen-saturated ethyl alcohol were added. The tube was warmed gradually, with stirring, whereupon a sudden exotherm was observed when the temperature of the bath reached 27° C. The pressure jumped from less than 20 p.s.i.g. to 50 p.s.i.g., then gradually subsided to less than 20 p.s.i.g. at 29° C. The mixture then was stirred for 30 minutes at 40° C., after which the tube was cooled in ice and 6.49 g. (120 millimoles) of additional 1,3-butadiene were added. The tube again was warmed with stirring, but no exotherm was observed. The mixture was stirred for 17 hours at 43° C. and then cooled, after which 20 ml. of pentane were injected. The tube then was opened, and 25 ml. of 1 M hydrochloric acid and 10 ml. of pentane were added. The organic layer was separated and washed with water.

Gas chromatographic analysis of the washed organic layer showed that 7.3 g. of 4-vinylcyclohexene were produced, representing a 38 percent conversion of the total butadiene charged. No other volatile product was detected, and no non-volatile residue remained upon evaporation of solvent from the organic layer.

This run further demonstrates the effectiveness of the invention using a dinitrosyliron halide together with another complex hydride to produce a dimer with little or no other product formation.

EXAMPLE IV

In a 110 ml. Pyrex aerosol tube in a dry-box were placed 0.02 g. (0.1 millimole) of dinitrosyliron chloride and 0.02 g. (0.5 millimole) of sodium borohydride. The tube was evacuated and cooled in ice, after which 12.96 g. (240 millimoles) of 1,3-butadiene were added. The tube was cooled in ice-salt, and 10 ml. of ethyl alcohol were added. The mixture then was stirred in a water bath at 20° C. for 16 hours. The resulting mixture was cooled in ice and 20 ml. of pentane were injected. The tube was opened and 25 ml. of 1 M hydrochloric acid were added. The organic layer was separated and washed with water.

Gas chromatographic analysis of the washed organic layer showed that 2.8 g. of 4-vinylcyclohexene were produced, representing a 21 percent conversion of butadiene charged. No other volatile product was detected.

This run further demonstrates the effectiveness of the invention using a dinitrosyliron halide together with a complex hydride to produce a dimer with little or no other product formation.

Although this invention has been described in considerable detail, it must be understood that such detail is for the purpose of illustration only and that many variations and modifications can be made by one skilled in the art without departing from the scope and spirit thereof.

I claim:

1. A catalyst system formed by mixing (I) a dinitrosyliron halide and (II) a reducing agent wherein said reducing agent is alkali metal hydride, complex hydride of an alkali metal and boron or aluminum, or organoaluminum halide which can be represented by the general formula $R'_xAlX_y$ wherein R' is a monovalent hydrocarbon radical having from 1 to 20 carbon atoms, X is a halogen, and $x$ and $y$ are integers of at least 1 each such that the sum of $x+y$ is 3.

2. The catalyst system as defined in claim 1 wherein said $R_x'AlX_y$ each said R' contains from 1 to 6 carbon atoms.

3. The catalyst system as defined in claim 1 wherein said (I) dinitrosyliron halide can be represented by the formula $Fe(NO)_2X$ wherein X is halogen and is chlorine, bromine, or iodine.

4. The catalyst system as defined in claim 3 wherein mole ratio of said (II) reducing agent to said (I) dinitrosyliron halide is 0.01:1 to 20:1.

5. The catalyst system as defined in claim 4 wherein said (II) reducing agent is said organoaluminum halide, said catalyst system further is formed in the presence of a diluent, and said diluent is a saturated or aromatic hydrocarbon, halogenated aliphatic or aromatic hydrocarbon, or mixtures, and contains up to 8 carbon atoms per molecule.

6. The catalyst system as defined in claim 4 wherein said (II) reducing agent is said alkali metal hydride or complex hydride of an alkali metal and boron or aluminum, and said catalyst system is formed in the presence of a diluent which substantially dissolves or disperses said hydride, and said diluent is an ether of 2 to 8 carbon atoms per molecule or mixture of said ethers.

7. The catalyst system as defined in claim 4 wherein said (II) reducing agent is said complex hydride of an alkali metal and boron, and said catalyst system is formed in the presence of a diluent which is a lower alcohol, ether, or combination.

8. The catalyst system as defined in claim 3 wherein said (I) dinitrosyliron halide is dinitrosyliron chloride.

9. The catalyst system as defined in claim 8 wherein said (II) reducing agent is diethylaluminum chloride, lithium aluminum hydride or sodium borohydride.

10. A process for forming a catalyst system which comprises contacting (I) a dinitrosyliron halide with (II) an alkali metal hydride, a complex hydride of an alkali metal and boron or aluminum, or an organoaluminum halide represented by the formula $R'_xAlX_y$ wherein R' is a monovalent hydrocarbon radical having 1 to 20 carbon atoms, X is a halogen and $x$ and $y$ are integers of at least 1 such that the sum of $x$ plus $y$ is 3, in the presence of a diluent; wherein said diluent is a saturated or aromatic hydrocarbon when said (II) is said organoaluminum halide; or is an ether of from 2 to 8 carbon atoms per molecule when said (II) is said alkali metal hydride or complex hydride of an alkali metal and boron or aluminum; or is a lower alcohol or ether when said (II) is said alkali metal borohydride.

11. A process as defined in claim 10 wherein the ratio of said (II) reducing agent to said (I) dinitrosyliron halide is from 0.01:1 to 20:1.

12. A process as defined in claim 10 wherein said (I) is dinitrosyliron chloride and said (II) is diethylaluminum chloride, lithium aluminum hydride, or sodium borohydride.

References Cited
UNITED STATES PATENTS

| | | | |
|---|---|---|---|
| 3,016,371 | 1/1962 | Natta et al. | 252—429 A X |
| 3,098,844 | 7/1963 | Polishuk | 252—429 A X |
| 3,427,365 | 2/1969 | Maxfield | 252—429 B X |
| 3,558,738 | 1/1971 | Dunn | 252—431 U X |

PATRICK P. GARVIN, Primary Examiner

U.S. Cl. X.R.

252—429 B, 432, 438